United States Patent
Trapp et al.

(10) Patent No.: US 6,706,437 B2
(45) Date of Patent: Mar. 16, 2004

(54) BIPOLAR PLATES FOR FUEL CELL STACKS

(75) Inventors: Victor Trapp, Augsburg (DE); Markus Leib, Eisenbrechtshofen (DE); Ruediger Hengl, Meitingen (DE); Tetsu Yamamoto, Kawagoe (JP)

(73) Assignee: SGL Carbon AG (DE)

( * ) Notice: Subject to any disclaimer, the term of this patent is extended or adjusted under 35 U.S.C. 154(b) by 57 days.

(21) Appl. No.: 09/757,501

(22) Filed: Jan. 10, 2001

(65) Prior Publication Data

US 2002/0127457 A1 Sep. 12, 2002

(51) Int. Cl.[7] .............................. H01M 2/00; H01B 1/06
(52) U.S. Cl. ........................................ 429/34; 252/511
(58) Field of Search .............................. 429/34, 35, 36, 429/12; 252/511

(56) References Cited

U.S. PATENT DOCUMENTS

| 4,214,969 | A | | 7/1980 | Lawrance |
| 4,343,339 | A | | 8/1982 | Schwindt et al. |
| 4,360,485 | A | * | 11/1982 | Emanuelson et al. ...... 264/29.5 |
| 4,956,131 | A | | 9/1990 | Shigeta et al. |
| 5,064,896 | A | | 11/1991 | Martin |
| 5,766,687 | A | | 6/1998 | Rappoport |

FOREIGN PATENT DOCUMENTS

| EP | 0 318 878 | | 7/1989 | |
| EP | 0 933 825 | | 8/1999 | |
| EP | 0 949 704 | | 10/1999 | |
| EP | 0949704 | * | 10/1999 | ............ H01M/8/02 |
| EP | 0 955 686 | | 11/1999 | |
| EP | 0 975 040 | | 1/2000 | |
| EP | 1 030 393 | | 8/2000 | |

* cited by examiner

Primary Examiner—Stephen Kalafut
Assistant Examiner—Raymond Alejandro
(74) Attorney, Agent, or Firm—Connolly Bove Lodge & Hutz LLP

(57) ABSTRACT

This invention relates to bipolar plates for electrochemical cells, particularly low-temperature fuel cells, with surface modification to enhance through-plate conductivity, processes for improving the surface properties of those bipolar plates, and fuel cell assemblies made with such plates. Graphite-polymer composite bipolar plates with high bulk conductivity are subjected to an abrasive surface treatment to improve the surface contact as well as the reactant transfer to the adjacent gas diffusion electrodes.

3 Claims, 3 Drawing Sheets

BIPOLAR PLATES FOR FUEL CELL STACKS

BACKGROUND OF THE INVENTION

1 Field of the Invention

The present invention relates to surface treated bipolar plates for electrochemical cells, particularly polymer electrolyte membrane fuel cells (PEMFC), a process for improvement of the surface properties of such bipolar plates, and fuel cells made with such bipolar plates.

2 Description of the Related Art

A fuel cell converts a fuel such as hydrogen, and an oxidant, typically oxygen or air, in an electrochemical reaction into electricity, reaction products and excess heat. As shown in FIG. 1, a single fuel cell 1 is typically constituted of an electrolyte layer 2 sandwiched between two typically flat porous electrodes 3 and 4, individually referred to as the anode 3 and the cathode 4.

A single polymer electrolyte membrane fuel cell (PEMFC) comprises a thin polymer membrane with high proton conductivity as electrolyte placed between two porous electrodes. The electrode surfaces adjacent to the electrolyte are covered with thin porous layers containing the electrocatalysts typically comprising metals from the platinum group.

Oxidation of hydrogen at the anode 3 catalyst layer generates protons and electrons. The protons are transferred across the electrolyte to the cathode. The electrons travel via an external circuit to the cathode 4. At the cathode 4, oxygen is reduced by consumption of two electrons per atom to form oxide anions which react with the protons that have crossed the electrolyte layer to form water.

A plurality of single cells is usually assembled in a stack to increase the voltage and hence, the power output. Within the stack, adjacent single cells are electrically connected by means of bipolar plates (BPP) 5 and 6 positioned between the surfaces of the electrodes opposite to those contacted with the electrolyte membrane. These BPP must be impermeable for the reactants to prevent their permeation to the opposite electrode, mixing and uncontrolled chemical reaction. With respect to this function, the BPP is often referred to as separator, too. Those BPP or separators can be made of metals, particulate carbon and graphite materials, impregnated graphite or lately also by moulding compounds consisting of graphite and a polymer binder (cf. U.S. Pat. No. 4,214,969). Flow channels or grooves on the surfaces of the BPP provide access for the fuel to the adjacent anode 3 and for the oxidant to the adjacent cathode 4 and removal of the reaction products and the unreacted remnants of fuel and oxidant. These flow channels reduce the useful surface of the BPP, as the electrical contact area is limited to the part of the surface between the channels.

The electrodes 3 and 4 comprise a porous structure referred to as gas diffusion layer (GDL). These GDL have to provide an efficient entry passage for both fuel and oxidant, respectively, to the catalyst layer as well as an exit for the reaction products away from the catalyst layer into the flow channel of the adjacent BPP. To facilitate the mass transfer between the flow channels and the GDL pores, the GDL surface area exposed to the channels should be as large as possible. It is preferred, therefore, that a large portion of the BPP surface is consumed by the flow channels with only a small portion remaining for the electrical contact. Reduction of the electrical contact area is limited, however, by the high contact resistance between BPP and GDL. The contact area between these two must be sufficiently large to avoid local overheating at high current densities which would finally lead to destruction of the assembly. Only a significantly reduced contact resistance between BPP and GDL would allow for a larger channel area and thus better transfer of fuel and oxidant to the electrodes thereby increasing the power output of the fuel cell.

Several suggestions have been made to improve the electronic contact between BPP and GDL, many of them resulting in rather complicated layered structures of the BPP. Those structures (cf. e.g. U.S. Pat. No. 4,956,131) generally comprise an inner layer made of metal or a gas-impermeable conductive carbon material to prevent gas leakage and provide mechanical stability, and outer contact layers made of a porous soft conductive material such as carbon fibres, thermal expansion graphite (cf. EP-A 0 955 686) or carbonaceous dispersed particles (cf. EP-A 1 030 393) to provide good electrical contact to the GDL. It is obvious that the manufacturing of multi-layer BPP is a rather time-consuming and expensive process requiring a more complex technology, compared to the production of a monolithic separator with uniform composition. Therefore it is preferable to create the desired surface properties of the BPP by a rather simple physical or chemical treatment following the process of shaping/moulding or machining.

In the European Patent Application EP-A 0 949 704, a method is described to improve the surface contact between BPP and GDL by immersion of the BPP in acidic solutions. This method, however, involves the utilisation of 30 wt % sulfuric acid and is carried out at 90 □C. over a long period of time. Such a treatment can attack the polymer binder as well as the graphite material of a BPP and is not suitable for mass production.

Other methods to modify the surface of the BPP as disclosed in EP-A 0 975 040 comprise plasma treatment, corona-discharge treatment and ultraviolet-irradiation treatment each in an atmosphere of hydrophilicising gas. While aimed mainly on improving the hydrophilicity of the BPP surface, most of the examples described there clearly show that the resistivity of the BPP (as measured with the four-probe-method) is negatively affected by the plasma treatment. The resistivity of BPP made by moulding a mixture of phenolic resin and scaly graphite and then subjected to plasma treatment with varying time, output power and hydrophilicising gas was comparable or even significantly higher than that of the untreated BPP made of the same material. Only with increased plasma output power and rather long treatment time a slight decrease of the resistivity (from 15 to 12 mΩ·cm) was achieved. Further shortcomings of this method are the expensive and complex equipment necessary for the plasma or irradiation treatment and the possible destruction of resin particles not only at the surface but also in the bulk of the BPP due to local overheating during plasma treatment.

Consequently a method is required that allows reliable and persistent improvement of the state of the BPP surface employing relatively simple and low cost technique. In the European Patent Application EP-A 0 933 825, a manufacturing method for BPP is disclosed which includes grinding of the press-moulded BPP in order to reduce the contact resistance and to improve the hydrophilicity of the BPP surface. This is not the method of choice since the BPP surface is likely to be contaminated by the grinding agent.

SUMMARY OF THE INVENTION

It is an object of the present invention to enhance the conductivity of a BPP especially in the surface region, and thereby minimise the contact resistance between BPP and GDL in a fuel cell assembly. It is a further object to provide an inexpensive method to manufacture BPP with enhanced surface conductivity.

It has now been found that bipolar plates for electrochemical cells comprising a polymer bound conductive material which are devoid of a skin of binder material and which exhibit a through-plane resistivity of not more than 1mΩ·m, preferably less than 0.9 mΩ·m, and especially preferred less than 0.85 mΩ·m, and a surface roughness as measured with a 3 μm front end diameter probe is at least 1.5 μm, and not more than 9 μm have the desired low contact resistance, or high conductivity.

A bipolar plate is said to have a skin of binder material if the partial density of the conductive material in the outer layers which form the flat surface of the plates with a thickness of 5 μm is considerably less than the average partial density of the said conductive material in the overall plate material composition. The partial density in the outer layer is regarded as considerably less if it is less than 70 percent of the overall partial density. Preferably, therefore, a bipolar plate according to this invention exhibits a partial density of conductive material in the outer layer of not less than 80 percent, especially preferred not less than 85 percent of the overall partial density of the said conductive material. Partial density is defined as the ratio of the mass of one component in the mixture and the volume of the mixture. It is further preferred that the deviation from the overall partial density of conductive material in a surface layer with a thickness of 2 μm is so small that it is not less than 70 percent of the overall partial density, or preferably, not less than 80 percent, especially preferred not less than 85 percent of the overall partial density of the said conductive material.

It has also been found that an abrasive treatment which involves exhibiting an untreated plate to a flow of abrasive material which is accelerated into the direction where the plates to be treated are aligned, such as sand-blasting, especially by blasting with an abrasive consisting of inert particles of suitable form and size, provides bipolar plates of the desired through-plane resistivity and surface roughness. This abrasive treatment is applied after complete shaping of the BPP by moulding with subsequent machining, by press-moulding, by injection-moulding or any other state-of-the-art technology.

The abrasive treatment according to this invention results in a reproducible and persistent reduction of the through-plane resistance by at least 30% without mechanical disintegration or destruction of the flow channel structure, without giving rise to gas leakage due to the surface treatment of the plate. Mechanical strength and structural integrity of the BPP are not reduced by the abrasive treatment because by reasonable adjustment of the operation parameters, the thickness reduction is kept in the range of usual manufacturing tolerances. Since the abrasive particles or medium are chosen to be inert towards the constituents of the BPP, the material is not attacked.

Use of the sandblasting technique allows nearly uniform access of the abrasive to all parts of the BPP surface, i.e. protruding lands or fins, and recessed channels, and nearly uniform abrasion can be achieved. Even complicated flow channel structures e.g. containing curvatures are accessible for the abrasive. This is not the case when the abrasion is carried out with a planar tool like in conventional grinding processes.

Another advantage of the method according to the invention is the possibility to perform the surface treatment in a continuous fully-automated process which may be integrated into an automated BPP manufacturing line. This is not possible with other known technologies such as with a plasma treatment because the transfer of the BPP into and out of the plasma chamber introduces discontinuity.

DETAILED DESCRIPTION OF THE PREFERRED EMBODIMENTS

Figure 1:
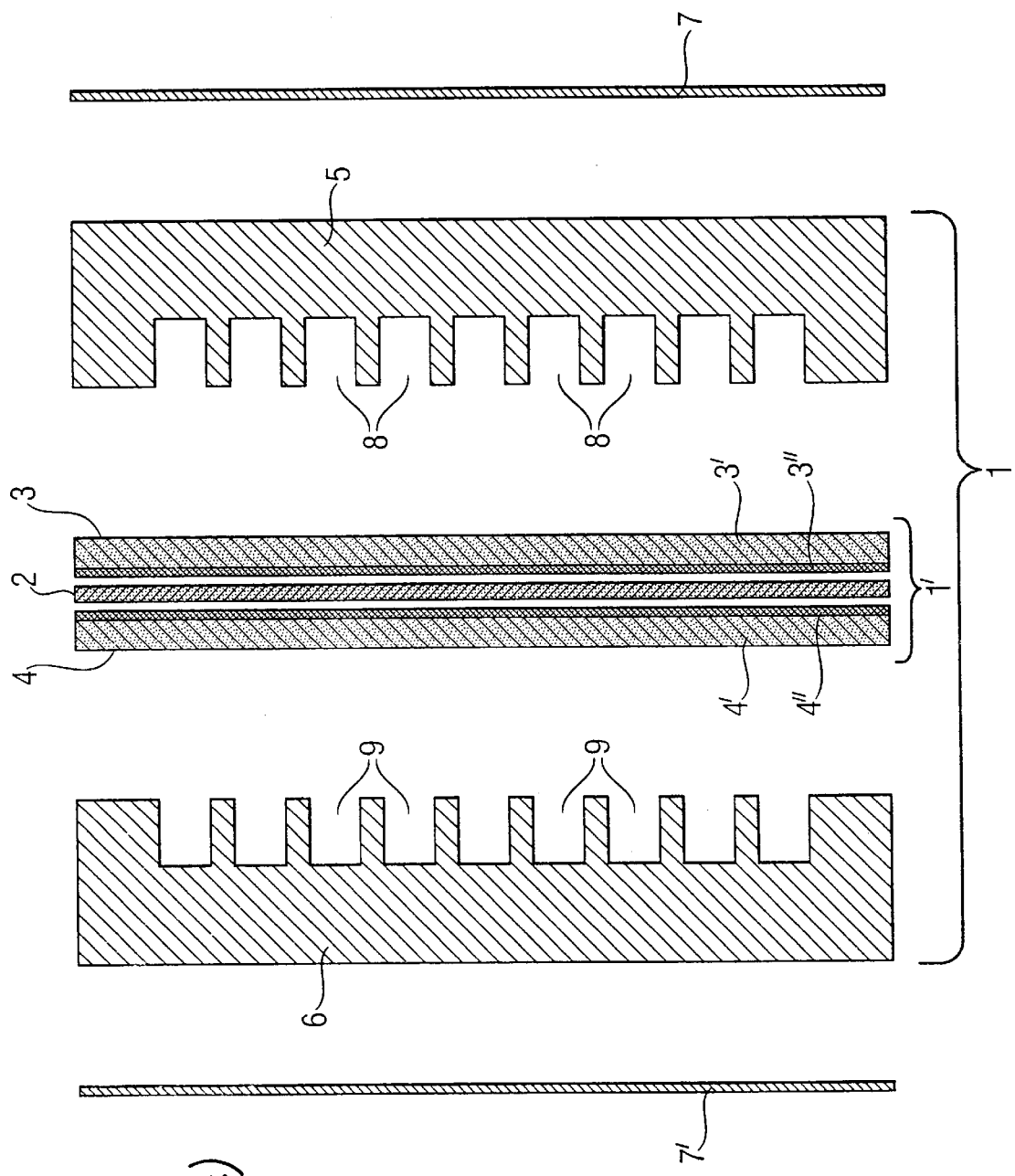
FIG. 1 is an exploded view of a typical fuel cell.

The BPP used for this invention can be made from conductive fillers selected from the group consisting of carbon and graphite particles and graphite fibres mixed with a binder selected from the group consisting of thermoplastic and thermoset polymers, and shaped according to the desired flow channel structure by machining of a moulded body, or direct press moulding or injection moulding with the desired structure. Preferably, the mass fractions of conductive material and polymeric binder range from 33 to 98 percent for the conductive material, and 67 to 2 percent, for the binder, with the sum of the mass fractions being equal to 100 percent.

It is preferred that the BPP are homogeneous, i. e. that they do not exhibit deviations in their composition (measured as the ratio of the mass of conductive material and the mass of inert material in a given volume segment). This deviation should be preferably kept at a maximum of 15 percent, preferably of 10 percent, and especially preferred, of 5 percent. It is further preferred that such deviation from homogeneity should be kept low (i. e. less than these limits of 15, 10, and 5 percent, respectively) when travelling perpendicular to the plane of the BPP.

In a preferred embodiment, the surface roughness of the BPP surface is from 1.8 to 8.5 μm, more preferably, from 2.0 to 8.0 μm, and especially preferred, from 2.3 to 6.5 μm.

The BPP are shaped to the desired form either by direct moulding, or by subsequent machining.

The BPP surface is treated by subjecting it to a flow of abrasives consisting of inert solid particles at well-defined operation parameters. These include particle composition, particle diameter and form, particle velocity, transport gas pressure, distance between the nozzle and the BPP surface, oscillation pattern and oscillation velocity of the nozzle above the BPP surface and passing-through speed of the BPP through the abrasive system. Treatment with these abrasives removes the skin of the moulded body and leaves a BPP having the preferred surface roughness and through-plane resistivity.

The inert particles may be selected from, but are not restricted to, the group consisting of (quartz) sand, glass beads, ceramic particles including oxide materials like alumina, and non-oxide materials like silicon nitride and silicon carbide, pyrogenic or diatomaceous silica (diatomite, Kieselguhr), each of a diameter ranging from 50 to 200 μm, and most preferably between 90 and 150 μm. The gas pressure is preferably adjusted within the range of 1.5 to 3 bar (0.15 to 0.3 MPa).

Alternatively, particles of frozen liquids like water (ice) or solid carbon dioxide can be used as the abrasive.

It is also possible to use liquids as abrasive. Water of sufficient pressure, i. e. above 500 bar (7000 psi, 50 MPa), preferably in excess of 1000 bar (14500 psi, 100 MPa) can successfully be used as abrasive. Liquid droplets used as abrasives generally have a droplet diameter of from about 1 $\mu$m to about 500 $\mu$m.

The form of the inert solid particles may be spherical, as is the case with glass beads, or it may be irregular, as is the case with quartz sand, with a plurality of edges and corners. Experience has shown that particles of irregular form are more efficient in their abrasive power.

The intensity of the abrasive treatment and therefore, the degree of abrasion and surface removal is a function of several operation parameters, namely the particle size of the abrasive, the pressure, the abrasive velocity (measured as mass of abrasive per unit time, in kg/min), the distance between nozzle and BPP surface, the pattern and velocity of the oscillation of the blasting nozzle above the surface of the BPP and the passing through speed of the BPP workpiece through the particle stream. By reasonable adjustment of all these parameters the degree or amount of abrasion can be kept well below 5 hundredths of a millimeter (0.05 mm) which is right within the manufacturing tolerances.

To take maximum advantage of the invention, complete removal of the abrasive particles after finishing the treatment is essential since it has been found that only a clean BPP surface provides a minimum contact resistance with the GDL. Such cleaning can be done e.g. by blowing the BPP surface with pressured air or by brushing it. Thus any contamination of the surface by the abrasive which could block the electrical contact is prevented. Exclusion of any contaminants is also very important in order to avoid catalyst poisoning and membrane degradation during fuel cell operation. It is easily understood that in the case of frozen water or carbon dioxide, or with liquids as abrasive particles, residues of abrasives are easily removed by heating the plates or subjecting them to a gas flow. It is most preferred in this respect to use solid particles of carbon dioxide as the residues evaporate, and there is no source of contamination.

It is preferred to conduct the abrasive treatment in such a way that the partial density of conductive material in the outer layer is not less than 80 percent of the overall partial density, particularly such that it is not less than 90 percent, and especially preferred, not less than 95 percent of the overall partial density.

EXAMPLES

The present invention is described in more detail below by way of examples, which serve only to illustrate the invention, but are in no way limiting.

Example 1

Blank BPP without fluid flow channel structure were manufactured by moulding a compound consisting of 80 wt % synthetic graphite powder and 20 wt % PVDF (polyvinylidene fluoride) at 200° C.

Surface roughness was measured at two different positions using a Perthometer S6P with a probe of 3 $\mu$m front end diameter. $R_a$ values of 0.46 and 0.5 $\mu$m were obtained. Results are given in table 1a (Sample No. "0").

Weight, thickness and through-plane resistance of the plate were also determined. The thickness was measured using a micrometer screw and the through-plane resistance was measured using a pair of gold-coated electrodes of 50 mm diameter. Thickness and resistance were measured at four different positions. Results are given in table 1b (column titled "before blasting").

Then the BPP samples were subjected to abrasive treatments with glass bullets of different particle sizes (two independent runs per particle size, 5 seconds each) as given in table 1a, and subsequent cleaning by blowing with pressured air. The abrasive treatment was carried out at 2 bar pressure with a distance of 15 cm between nozzle and BPP surface. For "fine" particle size (40 to 70 $\mu$m, samples 1 and 2), the volume rate of abrasive was approximately 1.8 dm$^3$/min, for "medium" (90 to 150 $\mu$m, samples 3 and 4):1.5 dm$^3$/min, and for "coarse" (150 to 250 $\mu$m, samples 5 and 6):1.2 dm$^3$/min.

Roughness, weight, thickness and through-plane resistance were measured again after the treatment in the same positions, cf. table 1 b. Comparison of the resistances before and after the treatment indicate a decrease of the through-plane resistance by at least 52%, or an average of 60%, while the changes of weight and thickness are negligible: at most 1%, and an average of 0.7%.

TABLE 1a

| Sample No | Abrasive particle size | $R_a/\mu m$ (first position) | $R_a/\mu m$ (second position) |
|---|---|---|---|
| 0 | none | 0.46 | 0.5 |
| 1 | Fine (40 . . . 70 $\mu$m) | 2.4 | 2.82 |
| 2 | Fine (40 . . . 70 $\mu$m) | 3.09 | 2.98 |
| 3 | Medium (90 . . . 150 $\mu$m) | 3.32 | 3.05 |
| 4 | Medium (90 . . . 150 $\mu$m) | 3.2 | 2.98 |
| 5 | Coarse (150 . . . 250 $\mu$m) | 5.23 | 5.46 |
| 6 | Coarse (150 . . . 250 $\mu$m) | 5.6 | 5.84 |

TABLE 1 b

| | Position | before blasting | After blasting | Change (%) | Change (%) Average value |
|---|---|---|---|---|---|
| Weight / g | | 646.6 | 646.3 | 0.0 | 0 |
| Thickness / mm | 1 | 2.99 | 2.99 | 0 | 0.7 |
| | 2 | 3.48 | 3.46 | −0.6 | |
| | 3 | 3.55 | 3.52 | −0.9 | |
| | 4 | 3.11 | 3.08 | −1.0 | |
| Resistance / Ω | 1 | 2.45 * 10$^{-3}$ | 1.14 * 10$^{-3}$ | −53 | −60 |
| | 2 | 1.89 * 10$^{-3}$ | 0.91 * 10$^{-3}$ | −52 | |
| | 3 | 2.77 * 10$^{-3}$ | 0.90 * 10$^{-3}$ | −68 | |
| | 4 | 3.35 * 10$^{-3}$ | 1.11 * 10$^{-3}$ | −67 | |

Example 2

Blank BPP without fluid flow channel structure were manufactured by moulding a compound consisting of 75 wt % synthetic graphite powder and 25 wt % PVDF at 200° C.

Figure 2:
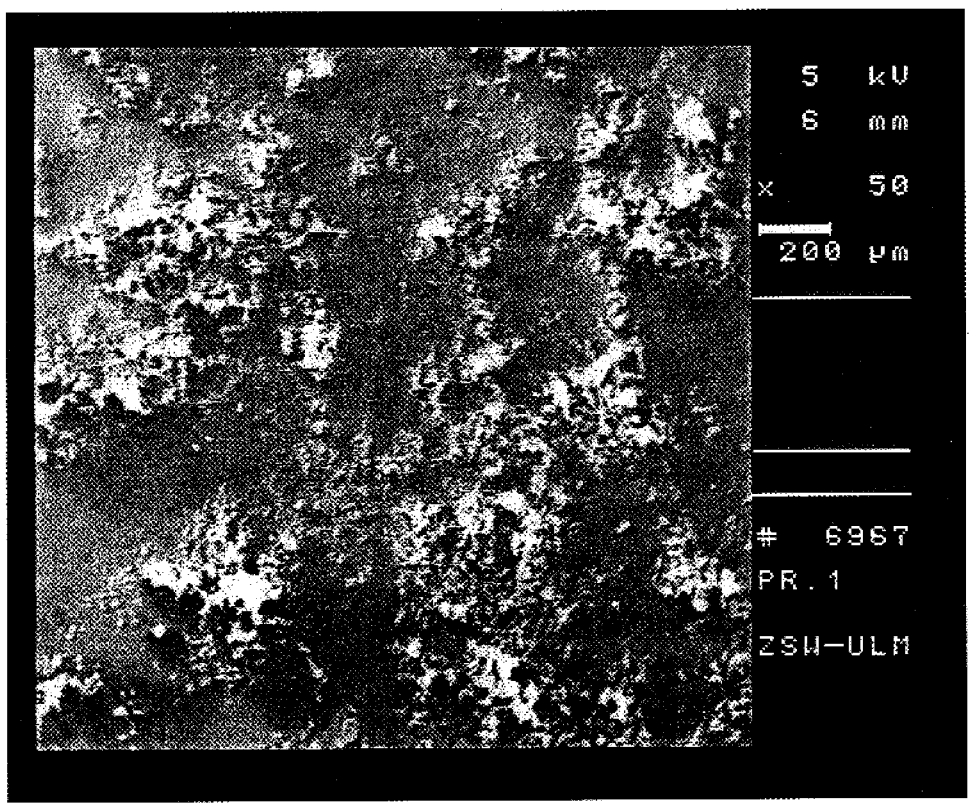
FIG. 2 is a SEM (scanning electron microscope) image of the BPP surface prior to the abrasive treatment.

It is obvious from FIG. 2 that no individual grains or flakes of graphite are present at the surface because the surface is covered with a skin consisting mainly of PVDF. It was proven by XPS (X-ray photoelectron spectroscopy) measurements that PVDF accumulates at the surface since the concentration of fluorine decreases drastically, as exemplified by the following data (smoothed XPS results):

TABLE 2

Fluorine content (number of fluorine atoms per 100 atoms of measured sample)

| Depth below surface in $\mu$m | 0.04 | 0.1 | 0.2 | 0.4 | 0.6 | 0.8 | 1.0 | 1.2 | 1.4 | 1.6 | 1.8 | 2.0 |
|---|---|---|---|---|---|---|---|---|---|---|---|---|
| Fluorine content in % | 15.2 | 5.7 | 3.8 | 2.6 | 2.1 | 1.9 | 1.7 | 1.4 | 1.3 | 1.2 | 1.1 | 1.1 |

It can be seen that there is only little variation at a depth of 1.6 $\mu$m and more below the surface, while there is a steep decrease in fluorine content up to 1.4 $\mu$m. This relates directly to the skin of fluorocarbon plastic material used as binder. Such skin acts as an insulator and thereby increases the resistance perpendicular to the surface.

Through-Plane resistance $R_b$ was determined as described in Example 1 at five different position. The results are given in table 3.

Than the BPP was subjected to an abrasive treatment as described in Example 1 with glass bullets of 90 . . . 150 $\mu$m diameter.

Figure 3:
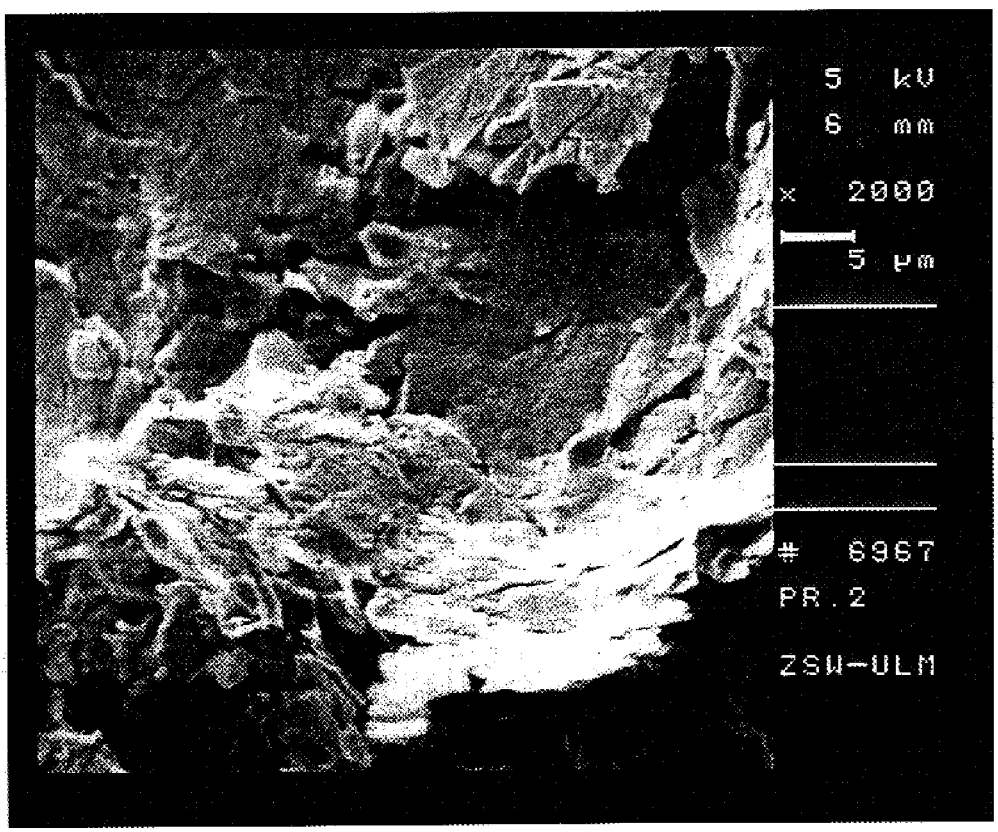
FIG. 3 is a SEM image of the BPP surface after the abrasive treatment and removal of the residual abrasive particles at higher resolution.

After this treatment, the remaining abrasive particles were removed by blowing the surface with pressured air. FIG. 3 clearly shows the presence of individual graphite grains and flakes at the no more covered by a plastic skin. FIG. 3 depicts the open and cleft structure of the BPP surface as resulting from the treatment described above.

Through-plane resistance $R_a$ was measured again after the treatment at the same positions. Comparison of the results given in table 3 indicates a decrease of the through-plane resistance by at least 24%.

TABLE 3

| position | $R_b/\Omega$ before blasting | $R_a/\Omega$ after blasting | Change (%) | Change (%) Average value |
|---|---|---|---|---|
| 1 | 3.07*10$^{-3}$ | 2.32*10$^{-3}$ | −24 | −31 |
| 2 | 2.81*10$^{-3}$ | 1.97*10$^{-3}$ | −30 | |
| 3 | 2.98*10$^{-3}$ | 2.06*10$^{-3}$ | −31 | |
| 4 | 2.75*10$^{-3}$ | 1.71*10$^{-3}$ | −38 | |
| 5 | 2.80*10$^{-3}$ | 1.92*10$^{-3}$ | −31 | |

Example 3

A BPP with flow channel structure is manufactured by moulding the mixture of Example 1 in an appropriate mould at 200° C.

Weight, thickness and through-plane resistance were determined as described in Example 1. The results are given in table 4.

Then the BPP was subjected to an abrasive treatment as described in Example 1 and subsequent cleaning by blowing with pressured air.

Weight, thickness and through-plane resistance were measured again after this treatment. Comparison of the results given in table 4 indicate a decrease of the through-plane resistance by at least 32% while the changes of weight and thickness are negligible.

TABLE 4

| | Position | before blasting | after blasting | Change (%) | Change (%) Average value |
|---|---|---|---|---|---|
| Weight / g | | 76.2 | 76.1 | −0.1 | −0.1 |
| Thickness / mm | 1 | 1.97 | 1.94 | −1.1 | −1 |
| | 2 | 2.04 | 2.02 | −1.2 | |
| | 3 | 2.28 | 2.27 | −0.3 | |
| | 4 | 2.05 | 2.02 | −1.4 | |
| Resistance / $\Omega$ | 1 | 1.80 * 10$^{-3}$ | 1.07 * 10$^{-3}$ | −41 | −39 |
| | 2 | 1.87 * 10$^{-3}$ | 1.06 * 10$^{-3}$ | −43 | |
| | 3 | 2.73 * 10$^{-3}$ | 1.64 * 10$^{-3}$ | −40 | |
| | 4 | 2.42 * 10$^{-3}$ | 1.64 * 10$^{-3}$ | −32 | |

Example 4

A BPP with flow channel structure is manufactured by moulding the mixture of Example 2 in an appropriate mould at 200° C.

Weight, thickness and through-plane resistance were determined as described in Example 1. The results are given in table 5.

Then the BPP was subjected to an abrasive treatment as described in Example 1 and subsequent cleaning by blowing with pressured air.

Weight, thickness and through-plane resistance were measured again after the treatment. Comparison of the results given in table 5 indicate a decrease of the through-plane resistance by at least 47% while the changes of weight and thickness are negligible.

TABLE 5

| | Position | Before blasting | after blasting | Change (%) | Change (%) Average value |
|---|---|---|---|---|---|
| Weight / g | | 68.3 | 68.3 | 0.0 | 0 |
| Thickness / mm | 1 | 2.02 | 2.01 | −0.3 | −0.3 |
| | 2 | 2.06 | 2.05 | −0.5 | |
| | 3 | 2.01 | 2.01 | 0.0 | |
| | 4 | 1.96 | 1.96 | −0.3 | |
| Resistance / $\Omega$ | 1 | 5.86 * 10$^{-3}$ | 3.09 * 10$^{-3}$ | −47 | −51 |
| | 2 | 7.34 * 10$^{-3}$ | 3.52 * 10$^{-3}$ | −52 | |
| | 3 | 5.95 * 10$^{-3}$ | 3.07 * 10$^{-3}$ | −48 | |
| | 4 | 6.64 * 10$^{-3}$ | 2.97 * 10$^{-3}$ | −55 | |

Although there is some scatter in the measurement results given in the examples the reduction of the resistance due to the abrasive treatment according to the present invention is significant. The scatter in the resistance data is explicable since the specific resistivities of the BPP components (graphite and PVDF binder resin) differ by at least 10 decades, and there are inhomogeneities on the scale of the particle size. Compared with this large spread of the resistivities of the components the scatter in the data can be neglected. The results of the thickness and weight measurements clearly show that the dimensions of the BPP are not significantly changed by the abrasive treatment.

While particular materials, processes and embodiments of the invention are described this description is not meant to be construed in a limiting sense. It is understood that various modifications of the preferred processes as well as additional embodiments of the invention will be apparent to those skilled in the art upon reference of this description without departing from the spirit and scope of this invention, as defined in the following claims. It is therefore contemplated by the appended claims to cover any such modifications or embodiments that fall within the true spirit and scope of the invention.

List of FIGS.

| | |
|---|---|
| FIG. 1 | Schematic view of a fuel cell |
| FIG. 2 | Scanning electron microscope image of a moulded BPP (Bipolar Plate) made of a graphite-polyvinylidene fluoride compound (mass ratio 80:20) |
| FIG. 3 | Scanning electron microscope image of a surface-treated BPP where the skin has been removed by blasting with abrasive material |

List of Reference Numerals in the FIGS.

| | |
|---|---|
| 1 | Fuel Cell Assembly |
| 1' | Electrode Assembly |
| 2 | Electrolyte Layer or Membrane |
| 3 | Anode |
| 3' | Anode Support Structure |
| 3" | Anode Catalyst Layer |
| 4 | Cathode |
| 4' | Cathode Support Structure |
| 4" | Cathode Catalyst Layer |
| 5, 6 | Bipolar Plates |
| 7, 7' | Current Collector Plates |
| 8, 9 | Grooves |

What is claimed is:

1. Bipolar plates for electrochemical cells comprising a polymer bound conductive material wherein said bipolar plates are devoid of a skin of binder material following treatment with a flow of abrasive material, wherein the through-plane resistivity of said bipolar plates does not exceed 0.85 m$\Omega$m, and wherein the surface roughness of said bipolar plates as measured with a 3 $\mu$m front end diameter probe is at least 1.5 $\mu$m, and not more than 9.0 $\mu$m.

2. Bipolar plates according to claim 1, wherein the conductive material is selected from the group consisting of particulate carbon and graphite materials.

3. The bipolar plates according to claim 1 wherein the partial density of the conductive material which is defined as the ratio of the mass of the conductive material in the mixture and the volume of the mixture, in the layers which form the flat surface of the plates with a thickness of 5 $\mu$m is not less than 80% of the average in the overall plate material composition of said partial density of said conductive material.

* * * * *